Figure 1:
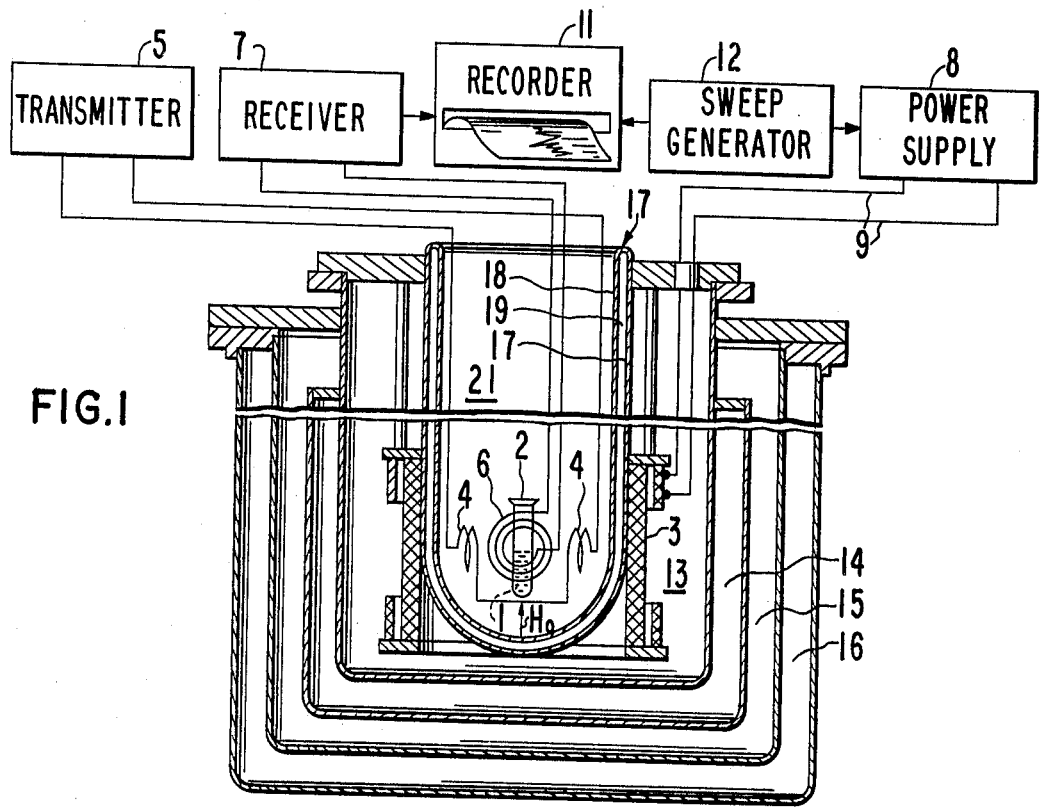

Oct. 21, 1969   H. E. WEAVER, JR., ETAL   3,474,294
SUPERCONDUCTIVE MAGNET PROTECTED BY FORWARD AND
BACKWARD CONDUCTING DIODE PAIRS
Filed April 19, 1966

INVENTORS
HARRY E. WEAVER JR.
FLOYD E. KINGSTON
BY
ATTORNEY

United States Patent Office 3,474,294
Patented Oct. 21, 1969

3,474,294
SUPERCONDUCTIVE MAGNET PROTECTED BY FORWARD AND BACKWARD CONDUCTING DIODE PAIRS
Harry E. Weaver, Jr., Portola Valley, and Floyd E. Kingston, Palo Alto, Calif., assignors to Varian Associates, Palo Alto, Calif., a corporation of California
Filed Apr. 19, 1966, Ser. No. 543,666
Int. Cl. H02h 7/06, 7/08, 7/10
U.S. Cl. 317—13
7 Claims A superconductive magnet and gyromagnetic resonance spectrometer utilizing same are disclosed. The superconductive magnet includes an improved protective circuit consisting of a parallel connection of backward and forward conducting diodes shunting the magnet and/or segments of the magnet, whereby excessively high transient voltages are prevented from building up in the superconductive magnet or in its power supply in use. The diodes are characterized by having a high current carrying capability and a very low threshold voltage, whereby the localized quenched regions of the magnet may be readily by-passed to prevent the quenched region from propagating throughout the magnet and causing the entire magnet to go normal.

Heretofore, superconductive magnets have been built wherein the superconductive solenoid magnet winding has been segmented into several sections with diodes connected across the terminals of the several sections of the solenoid. The diodes were connected in such a manner so as to continue the flow of current through the magnet winding in the event the current path to the magnet from the magnet power supply was interrupted. The diodes were connected to shunt the magnet current in one direction only around the interrupted power supply leads. In spite of these diodes, it was discovered that excessively high voltages were being developed inside the magnet winding and across the power supply when the magnet experienced a transition from the superconductive to the normal state. These excessively high voltages were developed depending upon the actual site of the quench in the various mutually coupled coils of the wire solenoid and burned out transistors in the power supply and produced arcs, burn out, and puncture of windings and insulation inside the magnet.

In the present invention, the superconductive magnet and its associated power supply are protected by connecting one or more pairs of parallel backward and forward conducting diodes across the magnet and/or segments of the magnet. In this manner excessively high transient voltages of either polarity are prevented from developing both in the windings of the magnet and in its associated power supply.

The principal object of the present invention is the provision of an improved superconductive magnet system.

One feature of the present invention is the provision of parallel connected pairs of backward and forward conducting diodes connected across the magnet and/or segments of the magnet windings whereby excessively high transient voltages are prevented in use.

Another feature of the present invention is the same as the preceding feature wherein the primary magnet winding includes several tapped segments with the backward and forward conducting diode pairs parallel connected across each of the several winding segments.

Another feature of the present invention is the same as any one or more of the preceding features wherein the protective diodes are connected across the magnet via a set of leads separate from the leads supplying current to the magnet from the power supply, whereby the protective diodes do not "see" the voltage drop across the magnet current supply leads.

Figure 2:
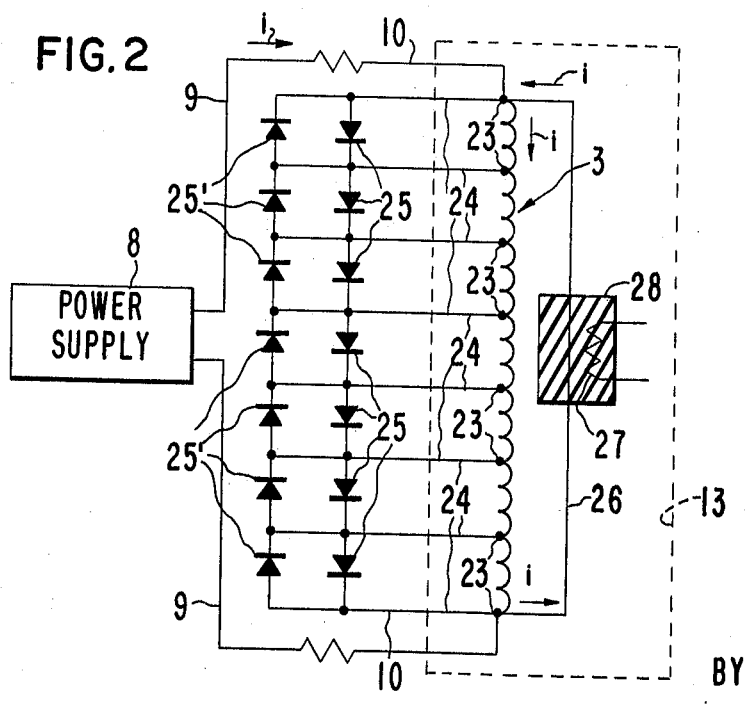
Figure 3:
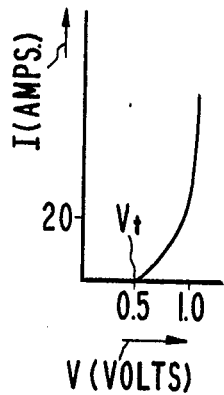

Other features and advantages of the present invention will become apparent upon a perusal of the following specification taken in connection with the accompanying drawings wherein:

FIG. 1 is a schematic diagram, partly in section and partly in block diagram form, of a gyromagnetic resonance spectrometer employing features of the present invention, FIG. 2 is a schematic circuit diagram of the superconductive magnet of FIG. 1, and FIG. 3 is a plot of current versus voltage for the power diodes of FIG. 2.

Referring now to FIG. 1, there is shown a diagram of gyromagnetic resonance spectrometer utilizing a superconductive magnet system. A sample of matter 1 which is to be investigated is disposed within a vial 2 and positioned within the central portion of a magnetic field $H_o$ produced by a superconductive solenoid 3. A pair of transmitter coils 4 are disposed straddling the sample 1 with their axes disposed at appromixately right angles to the direction of the magnetic field $H_o$. The transmitter coils 4 are energized by R.F. wave energy derived from a transmitter 5. A detector coil 6 is disposed adjacent the sample of matter 1 with its axis oriented at approximately right angles to the axis of the transmitter coil 4 and to the direction of the magnetic field $H_o$. The receiver coil 6 is connected to the input of an R.F. receiver 7.

The superconductive solenoid 3 is energized from a power supply 8 via leads 9 and generates a high intensity uniform D.C. magnetic field $H_o$ as of, for example, 55–65 kilogauss over a region of 0.5" x 0.5" x 2.0". The circuits of the power supply 8 and superconductive solenoid 3 will be more fully described below.

In operation, the solenoid 3 is energized and R.F. energy derived from the transmitter 5 is applied to the sample 1. The frequency of the R.F. is substantially at the Larmor frequency of the gyromagnetic bodies within the sample 1 under analysis, thereby exciting gyromagnetic resonance of the gyromagnetic bodies in the polarizing D.C. field $H_o$. Resonance of the gyromagnetic bodies is detected by the pick up, in receiver coil 6, of an R.F. signal emanating from the resonant bodies at the Larmor frequency. The resonance signal is applied to the input of the receiver 7 and is amplified and detected therein to provide an output D.C. resonance signal which is fed to and recorded by recorder 11.

A gyromagnetic resonance signal spectrum of the sample under analysis is obtained by sweeping the D.C. magnetic field intensity $H_o$ through successive resonances of the groups of gyromagnetic bodies within the sample 1 by means of a sweep generator 12 which provides a sweep signal to the power supply 8 which in turn sweeps the current flowing through tahe solenoid 3. In addition, the sweep generator supplies a signal to the recorder 11 causing the resonance signal to be recorded as a function of the sweep field. The gyromatic resonance signal spectrum obtained from the recorder 11 is useful for chemical analysis of the sample substance 1 under investigation.

The superconductive magnet system includes a hollow cylindrical chamber 13 surrounding the solenoid 3 and filled with a coolant at a very low temperature as of approximately 4° K. such coolant being typically liquid helium. The chamber 13 is insulated from ambient temperature by means of a plurality of coaxially nested surrounding chambers such chambers including chamber 14 which is evacuated to a very low pressure such as, for example, $10^{-6}$ millimeters of Hg to minimize thermal conduction therethrough. Vacuum chamber 14 is surrounded by a chamber 15 containing liquid nitrogen at approximately 77° K. The liquid nitrogen chamber 15 is in turn surrounded by a second vacuum chamber 16 for minimizing thermal conduction between the outside air and the nitrogen chamber 15. The outer wall of the vacuum chamber 16 forms the outer wall of the magnet assembly and is exposed on its outer surface to atmospheric conditions.

A glass or metal Dewar 17 is disposed centrally of the superconductive solenoid 3. The outer wall of the Dewar 17 forms the inner wall of the liquid helium chamber 13. The Dewar includes two coaxially disposed and spaced apart glass or metal walls 17' and 18 with a vacuum chamber 19 disposed therebetween. The inner coaxial wall 18 defines an open ended finger like chamber 21 at ambient atmospheric conditions extending down into the center of the superconductive solenoid 3. The finger like chamber 21 is open at the upper end to permit access to the magnetic field from the top. In a typical installation the superconductive solenoid 3 provides a D.C. magnetic field of up to 65 kilogauss centrally thereof. The solenoid 3 is constructed of a suitable superconductive material as of copper jacketed NbZr wire to provide a uniform field over its central region. This region of uniform field is cylindrical and is approximately ½" in diameter and 2" long.

Referring now to FIG. 2, there is shown the electrical circuit for the superconductive magnet of FIG. 1. The magnet circuit includes the primary winding 3 of the superconductive solenoid. The primary winding comprises, for example, 80 to 120 thousand feet of copper jacketed NbZr wire wound into a solenoid 12 inches long and 6 to 8 inches in diameter and having between 50 and 200 henries inductance. The superconductive wire is supplied from the manufacturer in length of 8 to 10 thousand feet and therefore the lengths are joined together at superconductive junctions 23 to form the total solenoid 3. The junctions 23 serve as convenient terminals for segmenting the solenoid 3 into several sections or segments as of 10 henries inductance each to provide protection for the solenoid.

Conductive leads 24 as of copper or other suitable conductor are brought out from the junctions 23. A pair of power diodes 25, such as silicon power diodes type 1N1193 or 1N248A manufactured by Motorola and each capable of passing 20–30 amps of current and having a volt-ampere characteristic as shown in FIG. 3, are parallel connected in shunt across each of the segments of the primary solenoid winding 3. One diode 25 of each pair is connected to pass current in the forward direction across the shunted segment of the primary winding and the other diode 25' is connected to pass current in the backward direction across the shunted primary segment. The diodes 25 are connected across the terminals of the magnet 3 via their own separate leads 10 such that the diodes are not turned on by voltage drops in the magnet current supply leads 9. Such supply leads 9 could be made of very heavy gauge wire to reduce voltage drops therein but to do so would increase the heat transfer from the external environment to the helium coolant and solenoid 3. Therefore a compromise is employed and the wire size is, for example, thermally insulated 10 gauge copper from the power supply 8 to liquid nitrogen temperature and thereafter #20 gauge copper Formvar wire is used.

A superconductive wire 26 is connected across the terminals of the primary winding 3. A heating element 27 is disposed adjacent the superconductive wire 26 intermediate its length. The heating element is embedded with the superconductive wire in a dielectric medium 28.

The primary magnet winding 3 is energized by passing current from the regulated current supply 8 via leads 9 through the primary winding 3. The diodes 25 will not conduct so long as the inductive voltage from the solenoid 3 or the applied voltage from the power supply 8 do not exceed the series threshold voltage of the series connection of diodes 25 as connected across the ends of the solenoid 3. For a case where there are $n$ number of segments to the complete primary winding 3 and the diodes have a characteristic threshold voltage of $V_t$, then the maximum applied voltage from the supply 8, and/or inductive voltage from the solenoid, before breakdown of the diodes, is $nV_t$. For the diodes having a characteristic as shown in FIG. 3 and there being 7 segments to the primary winding 3, the maximum applied voltage will be 3.5 volts. The thermal heating element 27 is also energized during the time the magnet 3 is being energized to raise the resistance of the superconductive wire 26 to about 60Ω in the normal state to prevent the shunting wire 26 from acting as a current bypass around the solenoid 3.

The current will build up in the primary winding 3 to some suitable level such as 20 a. At this time the heating element 27 is extinguished. When the liquid helium has cooled the wire 26 to a superconductive state, the magnet current can be switched into a persistent mode. In the persistent mode the magnet current as of 20 a. flows through the primary winding and back around the magnet and through the superconductive shunting wire 26 without loss. Magnet current is switched into the persistent mode by gradually reducing the current passing through the current supply 8. As the current drawn through the current supply 8 is reduced, the remaining portion of the total magnet current passes through the superconductive wire 26. When the current drawn by the current supply 8 is reduced to zero, the magnet is in a fully persistent mode with all the magnet current passing through the wire 26.

Oftentimes, as the primary winding 3 is being energized, it will unexpectedly and quite rapidly, i.e., within a few milliseconds, undergo a transition from the superconductive state to the normal state. When the superconductive magnet winding 3 shifts to a normal conductive state it typically starts out with a small localized region of the wire shifting to the normal state. This localized region becomes lossy and is quickly heated. The heated area then expands and if not arrested the transition to the normal conductive state propagates over the entire length of the magnet winding 3.

Several events can occur at the time the magnet experiences a transition to normal. If the magnet were not protected by both the backward and forward conducting diodes 25 the result could be catastrophic for the magnet 3 and/or the power supply 8.

Some of the principal events that can accompany a transition to normal are as follows: A current surge from the power supply 8 to supply power to the heated portion of the winding can cause the power supply to open up the circuit to the magnet 3. If the magnet is conducting current in the direction shown in the drawing then diodes 25' become conductive and allow the magnet current to circulate through the winding without developing a large voltage across the terminals of the magnet.

In some magnet systems, the magnet 3 is swept through the zero current condition. If the current in the magnet 3 were reversed from that shown in the drawing, as obtained during a sweep through zero, and the power supply opened the circuit to the magnet in response to a transition, then a very high transient voltage would be developed across the terminals of the magnet 3. The forward conducting diodes 25 prevent, in this latter case, large external voltages from being developed across the magnet 3.

Also the backward and forward conducting diodes 25 can prevent the localized heated area of the magnet winding from propagating. More particularly, assume the current is supplied to the magnet in the direction shown, and that the first end segment of the winding experiences a localized transition. Under these conditions an I.R. voltage drop would develop across the first segment of the winding 3. An inductive voltage of opposite magnitude would be developed across the remainder of all the windings of the magnet. Thus a substantial net resistive voltage would appear across the first segment. This resistive voltage drop is clamped by the forward conducting diode 25 which shunts the magnet current around the hot section. The remainder of the magnet may continue in the superconductive state until the bypassed heated portion of the first segment is cooled sufficiently to revert to its superconductive state. Thus, the parallel backward and forward conducting diodes are very useful for preventing damage to the magnet and its associated power supply. Furthermore, as we have seen, these diodes 25 can prevent the total magnet from undergoing a transition to the normal state.

Although the protective forward and backward conducting devices have been described as diodes, in a preferred embodiment, it is conceivable that certain other electron discharge or semiconductor devices which include a diode structure in conjunction with other electrodes or control elements could be employed in place of the simple diodes. All such devices which include a diode structure are intended to be included within the term "diode" as used herein.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a superconductive magnet, means forming a primary winding of the magnet comprising a multitude of turns of a superconductor, means forming a protective network connected in shunt across said primary winding, said primary winding including a plurality of series connected winding segments, the improvement wherein said protective network includes parallel connected first and second strings of series connected nonlinear devices, successive ones of said winding segments being connected in parallel with successive ones of said nonlinear devices in each of said first and second strings of nonlinear devices, said nonlinear devices having a nonlinear voltage-current characteristic with a relatively high resistance which changes to a relatively low resistance at a predetermined relatively low threshold breakdown voltage level less than 10 volts, and such nonlinear devices being connected in said first string with one polarity to pass current in a forward direction across each of said parallel connected winding segments when the forward voltage exceeds the relatively low threshold breakdown level and such nonlinear devices being connected in said second string with an opposite polarity to said devices in said first string to pass current in the backward direction across the parallel connected winding segments when the backward voltage exceeds the relatively low threshold breakdown voltage level of less than 10 volts, whereby certain transient voltages tending to develop in said primary winding which exceed the predetermined relatively low threshold voltage breakdown levels are suppressed, and whereby current in said primary winding can be diverted via said parallel connected nonlinear devices around various ones of said primary winding segments.

2. The apparatus according to claim 1 wherein said primary magnet winding means has an inductance greater than 50 henries.

3. The apparatus according to claim 1 including, means forming a D.C. curent source connected across said primary winding means for energizing said windings with current.

4. The apparatus according to claim 1 wherein said nonlinear devices are power diodes each having a threshold conduction voltage between 0.2 and 1.0 volt.

5. The apparatus according to claim 1 wherein a plurality of said primary winding segments each has an inductance greater than 10 henries.

6. The apparatus of claim 5 including in combination means for immersing a gyromagnetic resonance substance in the magnetic field of said superconducting primary winding means, and means for exciting and detecting gyromagnetic resonance of said resonance substance.

7. The apparatus of claim 4 including a set of leads for connecting said protective diodes across said primary magnet winding which leads are separate from another set of leads used for energizing said primary magnet winding with current.

References Cited

UNITED STATES PATENTS

| 3,187,224 | 6/1965 | Massena | 317—16 |
| 3,270,247 | 8/1966 | Rosner | 317—13 |
| 2,991,396 | 7/1961 | Schurr | 317—11 |
| 3,218,482 | 11/1965 | Green | 307—88.5 |
| 3,263,133 | 7/1966 | Stekly | 317—123 |

LEE T. HIX, Primary Examiner

R. V. LUPO, Assistant Examiner

U.S. Cl. X.R.

317—16, 123; 338—32